United States Patent
Sobolewski et al.

(10) Patent No.: US 9,932,816 B2
(45) Date of Patent: Apr. 3, 2018

(54) MOUNTING BRACKET FOR STRAIN SENSOR

(71) Applicant: Halliburton Energy Services, Inc., Houston, TX (US)

(72) Inventors: Zbigniew Sobolewski, Houston, TX (US); Mark A. Sitka, Richmond, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/338,100

(22) Filed: Oct. 28, 2016

(65) Prior Publication Data

US 2017/0044891 A1  Feb. 16, 2017

Related U.S. Application Data

(62) Division of application No. 14/408,243, filed as application No. PCT/US2013/077990 on Dec. 27, 2013, now Pat. No. 9,512,714.

(51) Int. Cl.
*F16L 3/10* (2006.01)
*E21B 47/01* (2012.01)
(Continued)

(52) U.S. Cl.
CPC .......... *E21B 47/01* (2013.01); *E21B 47/0006* (2013.01); *F16B 1/00* (2013.01);
(Continued)

(58) Field of Classification Search
USPC ........... 248/74.1, 74.4, 230.4, 230.5, 231.51, 248/231.61, 230.6, 231.71; 24/455, 499,
(Continued)

(56) References Cited

U.S. PATENT DOCUMENTS 1,852,347 A    6/1928  Getz
1,803,508 A *  5/1931  Rossman .................. E04G 7/24
                                          248/230.5
(Continued)

FOREIGN PATENT DOCUMENTS

GB         2454220         5/2012
JP       2013234899       11/2013
(Continued)

OTHER PUBLICATIONS

Bourouina, et al., "Preliminary results on a silicon gyrometer based on acoustic mode coupling in small cavities," Journal of Microelectromechanical Systems, vol. 6, No. 4, Dec. 1997, pp. 347-354.

(Continued)

*Primary Examiner* — Alfred J Wujciak
(74) *Attorney, Agent, or Firm* — Alan Bryson; Parker Justiss, P.C.

(57) ABSTRACT

The subject matter of this specification can be embodied in, among other things, a system for mounting a strain sensor on a tubular pipe, which includes a mechanical clamp. The clamp has a bottom flexing section having an arcuate portion terminating at a first terminal and at a second end, and a first and second upper flexing sections having an arcuate portions terminating at first terminal ends and at second terminal ends in a pivot pin assembly having a bore parallel to a central longitudinal axis of the clamp, the bore there through for receiving a removable connector. Sensor mounting arms are disposed outwardly on the first and second upper flexing sections, said sensor mounting arms including at least one receptacle sized to receive and retain ends of a strain gauge.

7 Claims, 4 Drawing Sheets

(51) Int. Cl.

| | |
|---|---|
| E21B 47/00 | (2012.01) |
| F16B 1/00 | (2006.01) |
| F16B 2/06 | (2006.01) |
| F16B 47/00 | (2006.01) |
| F16L 55/033 | (2006.01) |
| F16M 13/02 | (2006.01) |
| F16L 3/08 | (2006.01) |

(52) U.S. Cl.
CPC ............ *F16B 2/065* (2013.01); *F16B 47/003* (2013.01); *F16L 3/10* (2013.01); *F16L 3/1066* (2013.01); *F16L 55/0336* (2013.01); *F16M 13/02* (2013.01); *F16B 2001/0035* (2013.01); *F16L 3/08* (2013.01)

(58) Field of Classification Search
USPC .......................................... 24/504, 509, 513
See application file for complete search history.

(56) References Cited

U.S. PATENT DOCUMENTS

| | | | |
|---|---|---|---|
| 3,602,036 A | | 8/1971 | Peterson et al. |
| 3,768,954 A | * | 10/1973 | Marsh ................... B28B 7/0044 414/411 |
| 4,079,481 A | * | 3/1978 | Cacicedo ................ E05D 5/02 16/253 |
| 4,290,311 A | | 9/1981 | Brewer |
| 4,296,635 A | | 10/1981 | Claassen et al. |
| 4,346,864 A | | 8/1982 | Feller |
| 4,595,165 A | | 6/1986 | Klingensmith et al. |
| 4,706,501 A | | 11/1987 | Atkinson et al. |
| 4,807,479 A | | 2/1989 | Sako et al. |
| 5,099,700 A | | 3/1992 | Morin et al. |
| 5,134,281 A | | 7/1992 | Bryenton et al. |
| 5,379,836 A | | 1/1995 | Jordan |
| 6,453,108 B1 | | 9/2002 | Sirkis |
| 6,463,813 B1 | | 10/2002 | Gysling |
| 6,490,045 B1 | | 12/2002 | Dakin et al. |
| 6,494,642 B1 | | 12/2002 | Daly |
| 6,558,036 B2 | | 5/2003 | Gysling et al. |
| 6,880,408 B1 | | 4/2005 | Madden et al. |
| 6,910,534 B2 | | 6/2005 | Linyaev et al. |
| 7,302,139 B1 | | 11/2007 | Ames |
| 7,703,337 B1 | | 4/2010 | Feller |
| 7,779,912 B2 | | 8/2010 | Gissler |
| 7,810,265 B2 | | 10/2010 | Beatty |
| 7,963,175 B2 | | 6/2011 | Gysling |
| 8,294,583 B2 | * | 10/2012 | Sayegh ............... E05B 73/0017 24/16 PB |
| 8,365,601 B2 | | 2/2013 | Minachi et al. |
| 8,402,834 B1 | | 3/2013 | Moslehi et al. |
| 8,430,163 B2 | | 4/2013 | Dupont |
| 8,961,340 B2 | * | 2/2015 | Boatwright ........ A63B 59/0044 248/316.5 |
| 2003/0010126 A1 | | 1/2003 | Romanet et al. |
| 2005/0100414 A1 | | 5/2005 | Salama |
| 2007/0145198 A1 | * | 6/2007 | Miller ................... F16L 55/035 248/72 |
| 2008/0095496 A1 | | 4/2008 | Varadarajan et al. |
| 2011/0109912 A1 | | 5/2011 | Spross et al. |
| 2011/0116098 A1 | | 5/2011 | Spross et al. |
| 2011/0116099 A1 | | 5/2011 | Spross et al. |
| 2011/0220411 A1 | | 9/2011 | Dupont |
| 2012/0099097 A1 | | 4/2012 | Coupe et al. |
| 2012/0312552 A1 | | 12/2012 | Rayssiguier |
| 2013/0028555 A1 | | 1/2013 | Dailey |
| 2013/0120756 A1 | | 5/2013 | Spross |
| 2013/0128276 A1 | | 5/2013 | Spross et al. |
| 2013/0141733 A1 | | 6/2013 | Spross et al. |
| 2013/0193289 A1 | * | 8/2013 | Goffman ................. B62J 11/00 248/231.51 |
| 2014/0103172 A1 | * | 4/2014 | Tazioli ................. F16L 3/1066 248/74.4 |
| 2016/0230535 A1 | | 8/2016 | Sobolewski et al. |

FOREIGN PATENT DOCUMENTS

| | | |
|---|---|---|
| WO | 1999036757 | 7/1999 |
| WO | 2009056853 | 5/2009 |

OTHER PUBLICATIONS

Burdess, et al., "A system for the dynamic characterization of microstructures," Journal of Microelectromechanical Systems, vol. 6, No. 4, Dec. 1997, pp. 322-328.

Folch, et al., "Microfabrication of oxidation-sharpened silicon tips on silicon nitride cantilevers for atomic force microscopy," Journal of Microelectromechanical Systems, vol. 6, No. 4, Dec. 1997, pp. 303-306.

Koeneman, et al., "Feasibility of micro power supplies for MEMS," Journal of Microelectromechanical Systems, vol. 5, No. 4, Dec. 1997, pp. 355-362.

Lagorce, et al., "Magnetic and mechanical properties of micromachined strontium ferrite/polyimide composites," Journal of Microelectromechanical Systems, vol. 6, No. 4, Dec. 1997, pp. 307-312.

Lin, L., et al., "A micro strain gauge with mechanical amplifier," Journal of Microelectromechanical Systems, vol. 6, No. 4, Dec. 1997, pp. 313-321.

Luginbuhl, et al. "Microfabricated Lamb wave device based on PZT sol-gel thin film for mechanical transport of solid particles and liquids," Journal of Microelectromechanical Systems, vol. 6, No. 4, Dec. 1997, pp. 337-346.

Marques, et al., "Fabrication of high-aspect-ratio microstructures on planar and nonplanar surfaces using a modified LIGA process," Journal of Microelectromechanical Systems, vol. 6, No. 4, Dec. 1997, pp. 329-336.

Ouyang, et al., "Design of a New Compliant Mechanical Amplifier," ASME 2005 International Design Engineering Technical Conferences and Computers and Information in Engineering Conference, Paper No. DETC2005-84371, 2005, 10 pages.

Ried, et al., "6-MHz 2-N/m piezoresistive atomic-force microscope cantilevers with INCISIVE tips," Journal of Microelectromechanical Systems, vol. 6, No. 4, Dec. 1997, pp. 294-302.

Sobolewski, et al., "Improved Sagnac Pulse Detection System Background," U.S. Appl. No. 61/818,683, filed May 2, 2013, 10 pages.

Tea, et al., "Hybrid postprocessing etching for CMOS-compatible MEMS," Journal of Microelectromechanical Systems, vol. 6, No. 4, Dec. 1997, pp. 363-372.

\* cited by examiner

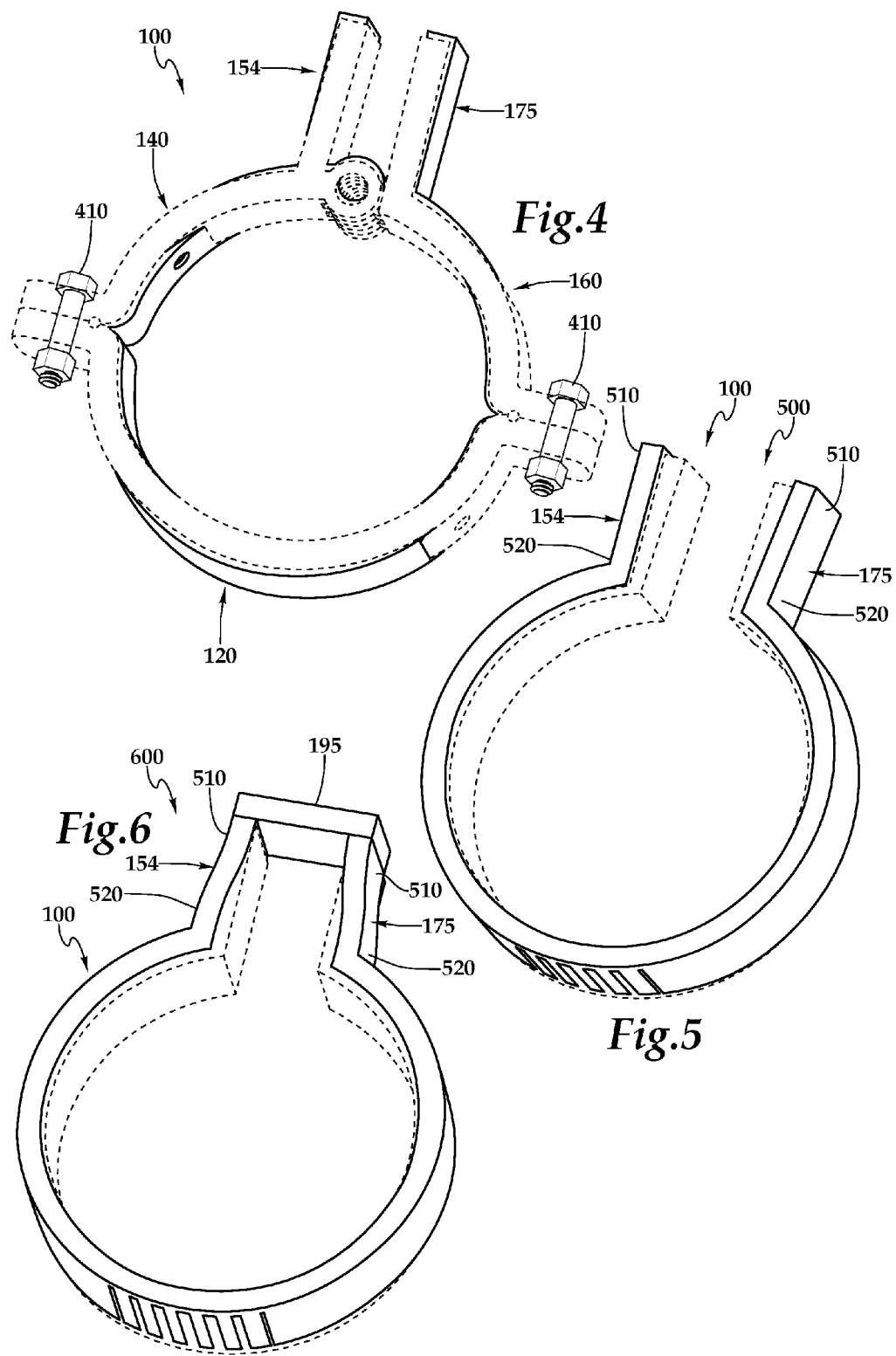

MOUNTING BRACKET FOR STRAIN SENSOR

CROSS-REFERENCE TO RELATED APPLICATIONS

This Application is a Divisional of U.S. application Ser. No. 14/408,243 filed on Dec. 15, 2014, entitled "MOUNTING BRACKET FOR STRAIN SENSOR," currently pending; which application is a U.S. National Stage of International Application No. PCT/US2013/077990, filed Dec. 27, 2013, entitled "MOUNTING BRACKET FOR STRAIN SENSOR," both of which are commonly assigned with the present invention and incorporated herein by reference.

TECHNICAL FIELD OF THE INVENTION

The present disclosure relates to an apparatus for mounting sensors on pipe sections.

BACKGROUND OF THE INVENTION

In connection with the recovery of hydrocarbons from the earth, wellbores are generally drilled using any of a variety of different methods and equipment. According to one common method, a drill bit is rotated against the subsurface formation to form the wellbore. The drill bit may be rotated in the wellbore through the rotation of a drill string attached to the drill bit and/or by the rotary force imparted to the drill bit by a subsurface drilling motor powered by the flow of drilling fluid down the drill string and through downhole motor.

The flow of drilling fluid can exhibit variations in pressure. These pressure variations can cause dimensional changes in solid structures such as piping that carries the drilling fluid to and from the drill string. Strain gauges are used for detection and measurement of absolute dimensional changes of solid structures, such a piping for drilling fluid, but such changes are generally very slow and difficult to observe with known equipment and measurement methods.

BRIEF DESCRIPTION OF THE DRAWINGS

FIG. 4 is a conceptual representation of an example optical sensor mount in a stressed condition.

FIG. 5 is a conceptual representation of an example optical sensor mount in a stressed condition.

FIG. 6 is another conceptual representation of an example optical sensor mount in a stressed condition.

DETAILED DESCRIPTION

This document describes systems and techniques for mounting sensor attachments to drilling fluid (also referred to in the industry as drilling mud) piping on drilling rigs. The assemblies described in this document can be used to mount several different types of optical sensors, including temperature, pressure, and/or strain sensors. Some of these sensors can be optical sensors and gauges based on the operating principles of a Fiber-Bragg grating and/or Fabry-Pérot interferometer.

In general, optical sensor mounts clamp, attach, or are otherwise affixed to an outside surface of one or more pipes in the drilling fluid piping system. Fluid (for example, drilling fluid) flowing through the pipe exerts a pressure force outward against the pipe, which causes small changes in the diameter of the pipe that vary with the pressure of the fluid within. The optical sensor mounts mechanically transfer, and in some implementations, amplify or reduce, changes in pipe diameter to one or more sensors. The signal outputs of such sensors can then be processed to observe changes in the diameter of the pipe. The changes in diameter of the pipe diameter may be processed using known physical characteristics of pressure pipes as described, for example, in "Pressure Vessel Design Manual" by Dennis Moss. Detection of said changes can allow for downhole pressure pulse detection whereas said pressure pulses can convey the specific information or data content, examples of which are described in Halliburton patents U.S. Pat. Nos. 7,480,207B2 and 7,404,456 B2.

Figure 1:
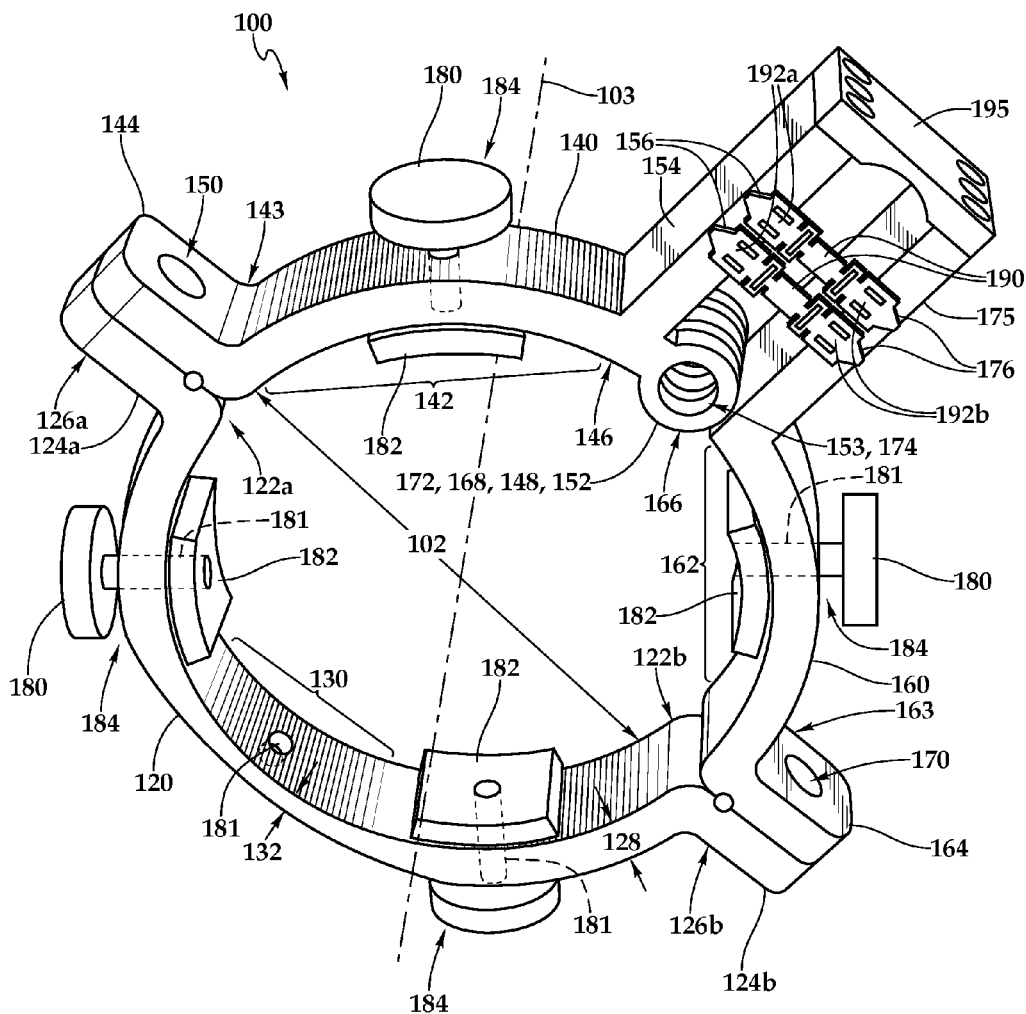
FIG. 1 is a perspective view of an example optical sensor mount.

FIG. 1 is a perspective view of an example optical sensor mount 100. The mount 100 is a generally circular mechanical clamp having an inner diameter 102 sized to accommodate an outer diameter of a pipe (not shown) on which the mount 100 is to be mounted. The mount 100 includes three main sections, including a bottom flexing section 120, a first upper flexing section 140, and a second upper flexing section 160.

The bottom flexing section 120 is a generally semi-circular arcuate portion, having a terminal end 122a in a mounting wing 124a, and a terminal end 122b in a mounting wing 124b. The mounting wing 124a is formed generally perpendicular to the terminal end 122a, and the mounting wing 124b is formed generally perpendicular to the terminal end 122b. The mounting wing 122a includes a bore 126a, and the mounting wing 122b includes a bore 126b, the bores 126a-126b for receiving a removable connector (not shown) such as a bolt or other appropriate fastener.

The bottom flexing section 120 has a thickness 128. The bottom flexing section 120 includes a subsection 130 that has a thickness 132 that is less than the thickness 128. In some implementations, as the bottom flexing section 120 flexes, the relatively lesser thickness 132 of the subsection 130 may cause distortion of the bottom flexing section 120 to be at least partly concentrated along the subsection 130.

The upper flexing section 140 includes an arcuate portion 142 that is generally quarter-circular in shape, terminating at a terminal end 143 in a mounting wing 144 and a terminal end 146 in a mounting wing 148. The mounting wing 144 is formed generally perpendicular to the terminal end 143 and includes a bore 150 for receiving a removable connector (not shown) such as a bolt or other appropriate fastener when the bore 150 is aligned with the bore 126a to removably affix the upper flexing section 140 to the bottom flexing section 120.

The mounting wing 148 is formed generally tangent to the terminal end 146 and includes a pivot pin assembly 152 having a bore 153 that is formed parallel to a central longitudinal axis 103 of the mount 100. The bore 153 is formed to receive a removable connector (not shown) such as a bolt or other appropriate fastener.

A sensor mounting arm 154 extends generally perpendicular from the upper flexing section 140. The sensor mounting arm 154 including at least one receptacle 156 sized to receive and retain an end 192a of a sensor 190, such as a strain gauge, an optical sensor, a Fiber-Bragg grating, a Fabry-Pérot interferometer etalon, or any other appropriate sensor.

The upper flexing section 160 includes an arcuate portion 162 that is generally quarter-circular in shape, terminating at a terminal end 163 in a mounting wing 164 and a terminal end 166 in a mounting wing 168. The mounting wing 164 is formed generally perpendicular to the terminal end 163 and includes a bore 170 for receiving a removable connector (not shown) such as a bolt or other appropriate fastener when the bore 170 is aligned with the bore 126b to removably affix the upper flexing section 160 to the bottom flexing section 120.

The mounting wing 168 is formed generally tangent to the terminal end 166 and includes a pivot pin assembly 172 having a bore 174 that is formed parallel to the central longitudinal axis 103 of the mount 100. The bore 174 is formed to receive a removable connector (not shown) such as a bolt or other appropriate fastener when aligned with the bore 153.

A sensor mounting arm 175 extends generally perpendicular from the upper flexing section 160. The sensor arm 175 including at least one receptacle 176 sized to receive and retain an end 192b of the sensor 190.

The mount 100 includes a collection of adjustment rods 180. The adjustment rods extend through the mount 100 inwardly in a radial direction toward the longitudinal axis 103 of the mount 100 through a collection of adjustment openings 181. The inward end of each of the adjustment rods 180 terminates in a landing pad 182. The adjustment rods 180 and the landing pads 182 form a collection of adjustment assemblies 184 formed to move the adjustment rods 180 and the landing pads 182 into adjustable contact with the pipe on which the mount 100 is to be mounted. In some embodiments, the adjustment assemblies 184 can include female threads in each of the adjustment openings, and the adjustment rods 180 can include at least a portion with male threads adapted to be received in the female threads. In some embodiments, compression pads can be affixed to the landing pads 182. In some embodiments, the compression pads can include layers of vibration and acoustic noise absorbing material.

When assembled in a substantially unstressed or a predetermined pre-stressed or strained configuration, the sensor mounting arms 154 and 175 are oriented substantially parallel to each other. In such a substantially parallel configuration, the sensors 190 are stressed to substantially the same degree. For example, two sensors 190 in the example parallel configuration can provide substantially the same outputs, which can be used to cancel out common mode noise differential measurement configurations.

In some implementations, the mount 100 can be removably affixed to a pipe by placing a fastener though the bores 126a and 150, and by placing another fastener through the bores 126b and 170, while omitting a fastener from the pivot pin assemblies 152, 172. In such an example configuration, as the pipe varies in diameter (e.g., due to variations in pressure of the fluid within the pipe), the unfastened pivot pin assemblies 152, 172 can separate slightly, causing the sensor mounting arms 154 and 175 to move away from their substantially parallel, unstressed configuration. As the sensor mounting arms 154 and 175 diverge, the sensors 190 mounted at different radial positions on the sensor mounting arms 154 and 175 will experience differing amounts of stress. In some implementations, the differing amounts of stress can produce a differential signal by the sensors 190 that can be processed to determine the absolute or change in fluid pressure within the pipe.

Referring now to FIG. 4, a simplified version of the mount 100 is shown to illustrate one example effect of stress upon the mount 100. In the illustrated example, the upper flexing sections 140, 160 are removably affixed to the bottom flexing section 120 by a pair of bolts 410 and the restraining bolt (not shown here) is inserted in the bores 153, 174. When the mount 100 is clamped about a pipe (not shown) that is substantially unpressurized and therefore substantially unexpanded, the mount 100 can take on the configuration shown in solid lines. When the pipe is pressurized, the walls of the pipe will expand. This expansion will cause the sensor mount arms 154 and 175 to converge or otherwise move relatively closer, taking on the configuration shown in dotted lines.

Referring again to FIG. 1, in some implementations, a linking plate 195 can be removably affixed to the radially distal ends of the sensor mounting arms 154 and 175 with respect to each other, mechanically linking the sensor mounting arms 154 and 175 to each other. By linking the sensor mounting arms 154 and 175 to each other through the linking plate 195, the movement of the sensor mounting arms 154 and 175 as the pipe expands and contracts can be modified. In some implementations, the linking plate 195 may be used as an aid to assembly of the mount 100 about the pipe. For example, the linking plate 195 may be used to temporarily affix the upper flexing sections 140, 160 during assembly, and may be removed after the upper flexing sections 140, 160 are affixed to the bottom flexing section 120.

Referring now to FIGS. 5 and 6, simplified versions of the mount 100 are shown to illustrate the effects of the linking plate 195 on the flexure of the mount 100. FIG. 5 is a conceptual example configuration 500 of the mount 100 without the linking plate 195 and without the restraining bolt. In the example configuration 500, as the pipe (not shown) expands within the mount 100, the sensor mounting arms 154 and 175 move from their substantially unstressed or pre-stressed configuration, as depicted in dotted lines, relatively apart to the stressed configuration depicted in solid lines. In general, without the linking plate 195 in place, the radially distal ends 510 of the sensor arms 154 and 175 will move relatively further apart from each other than will more radially proximal portions 520 of the sensor arms 154 and 175.

In some implementations, as the pressurized pipe's diameter D increases by X, the strain can be expressed as a ratio X/D. The same displacement X applied over a shorter distance L between expansion arms can lead to strain amplification because X/L>>X/D.

FIG. 6 is a conceptual example configuration 600 of the mount 100 with the linking plate 195 affixed across the sensor mounting arms 154 and 175 and the restraining bolt not present. In the example configuration 600, as the pipe (not shown) expands within the mount 100, the linking plate 195 partly constrains movement of the radially distal ends 510, causing the radially proximal portions 520 of the sensor mounting arms 154 and 175 to move from their substantially unstressed or pre-stressed configuration, as depicted in dotted lines, relatively apart to the stressed configuration depicted in solid lines. In general, with the linking plate 195 in place, the radially proximal portion 520 of the sensor mounting arms 154 and 175 will move relatively further apart from each other than will more radially distal ends 510 of the sensor arms 154 and 175. When the linking plate 195 is used, the pipe diameter expansion, which can be expressed as dD=X, can result in a minimal top gap increase Xmin at ends of sensor mounting arms 154 and 175 near the linking plate whereas Xmin is close to zero with additional and relatively larger Xmax increase in distance between arms at location closer to the pipe whereas Xmax can be approximated as Xmax=~PI*X.

Referring again to FIG. 1, in some implementations, a pivot pin (not shown) can be inserted through the bores 148, 168 of the sensor mounting arms 154 and 175. By placing the pivot pin in the bores 148, 168, as the pipe expands and contracts, the divergence of the sensor mounting arms 154 and 175 will pivot about the pivot pin. For example, as the pipe expands, the sensor mounting arms 154 and 175 can be caused to diverge from their substantially parallel, unstressed configuration and the arms will move inwardly at an angle toward each other.

In some embodiments, the pivot pin can be compressible or otherwise deformable, or can include a compressible or otherwise deformable coating about a substantially non-compressible core rod. In some implementations, the use of selected compressible or deformable components for the pivot pin can provide selectable modification of convergence or divergence of the sensor mounting arms 154 and 175. For example, by including a compressible pivot pin in the pivot pin assemblies 152, 172, separation of the pivot pin assemblies 152, 172 can be permitted in a reduced manner relative to movement that may occur with or without the use of a non-deformable pivot pin.

In some embodiments, the linking plate 195 can be formed to have a selected spring coefficient. For example, the stiffness of the linking plate 195 can be selected to selectably modify the divergence of the sensor mounting arms 154 and 175 under various stress configurations. In some embodiments, one or more sensors can be mounted on the linking plate 195. For example, sensors can be configured to provide signals that indicate tensile, compressive, or bending stresses at the linking plate 195. In some embodiments, one or more sensors can be mounted between inner surfaces of the sensor mounting arms 154 and 175 and/or in any other suitable section of 120, 140, and/or 160. For example, a load cell can be mounted between the sensor mounting arms 154 and 175 to provide a signal in response to relative inward and outward movements of the sensor mounting arms 154 and 175.

While the present example is shown and described as including four sets of the adjustment assemblies 184, various implementations can include any appropriate number of the adjustment assemblies 184 mounted through corresponding ones of the adjustment openings 181. For example, one of the adjustment assemblies 184 can be mounted on the upper flexing section 140, and another one of the adjustment assemblies 184 can be mounted in the adjustment opening 181 located in the bottom flexing section 120 approximately 180 degrees away. In another example, one of the adjustment assemblies 184 can be mounted in each of the upper flexing sections 140, 160, and a third one of the adjustment assemblies 184 can be mounted in the adjustment opening 181 located in the central section of the subsection 130.

Figure 2:
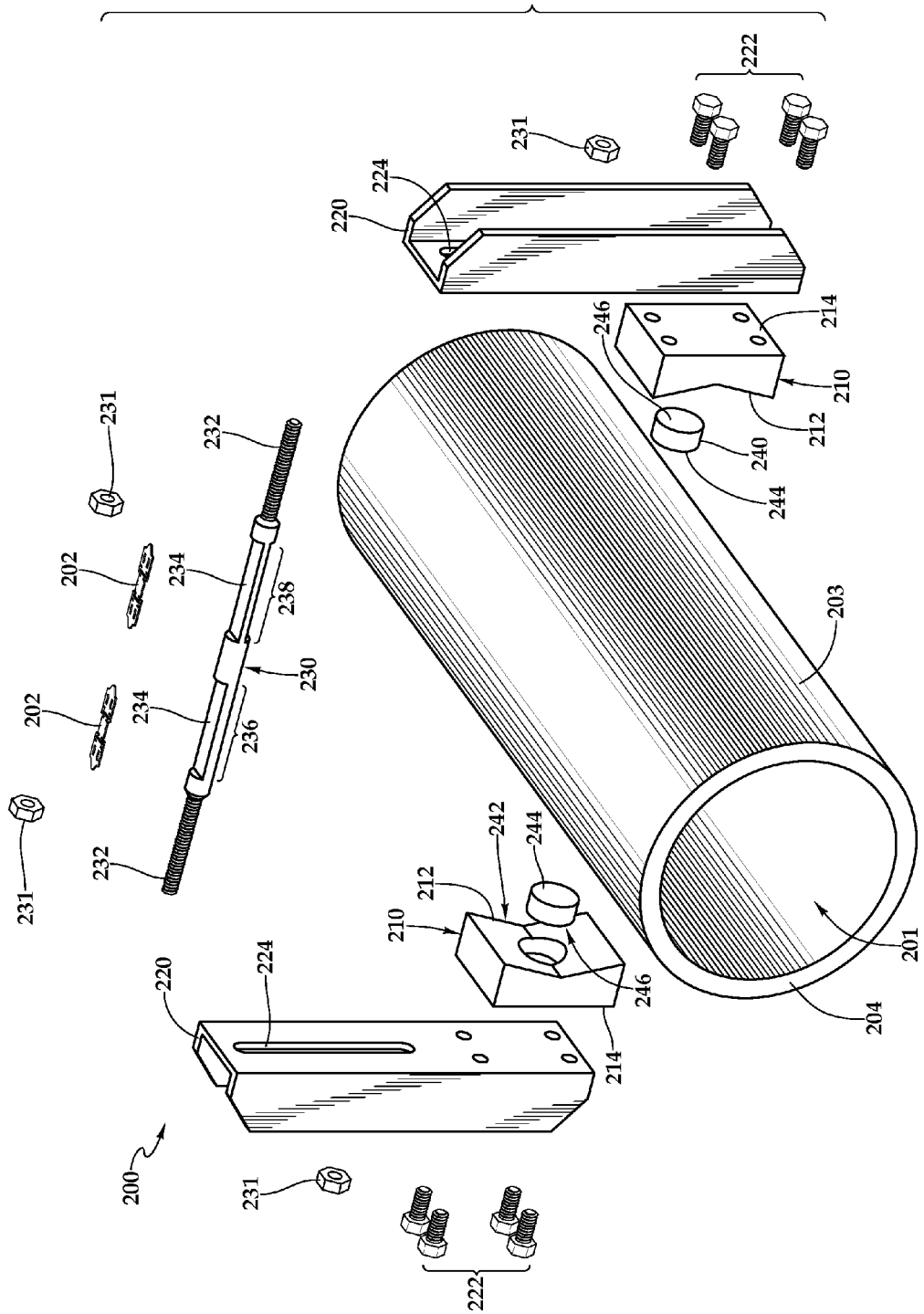
FIGS. 2 and 3 are exploded and perspective views of another example optical sensor mount.
Figure 3:
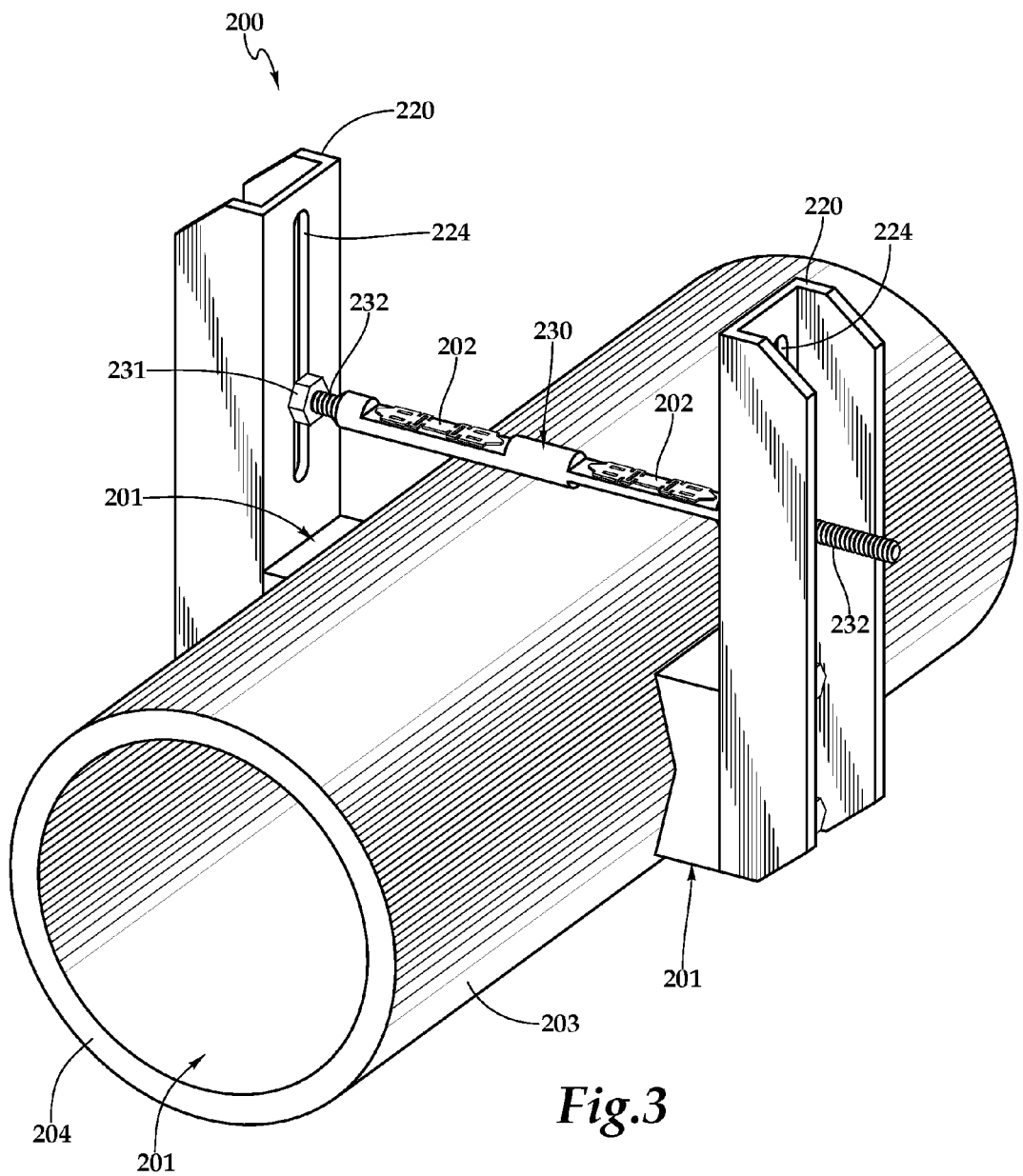

FIGS. 2 and 3 are exploded and perspective views of another example optical sensor mount 200. In general, the mount 200 is removably or permanently affixed to a pipe 201 to mechanically transmit variations in the diameter of the pipe 201 to a collection of sensors 202, such as a strain gauges, optical sensors, Fiber-Bragg gratings, Fabry-Pérot interferometers, or any other appropriate sensors.

The mount 200 includes a pair of mounting blocks 210 each having a proximal surface 212 and a distal surface 214. The proximal surfaces 212 are positionable adjacent to an outer surface 203 of a wall 204 of the pipe 201, and spaced about 180 degrees apart from each other.

The mount 200 includes a pair of sensor mounting arms 220. One of the sensor mounting arms 220 is removably affixed to each of the distal surfaces 214 by a collection of fasteners 222, such as bolts, screws, or other appropriate connectors. The sensor mounting arms 220 each includes a receptacle 224 configured to receive and retain an end 232 of a stem rod 230. The ends 232 are further retained by fasteners 231, such as nuts, retaining pins, or other appropriate connectors. In some embodiments, the ends 232 and the fasteners 231 can form a tension adjustment mechanism for the stem rod 230. For example, the adjustment mechanism can include male threads on at least one of the ends 232 of the stem rod 230, and the fasteners 231 can include female threads adapted to engage the male threads of the stem rod 230. In such examples, the fasteners 231 can be threaded along the ends 232 to adjust the tension along the stem rod 230.

The stem rod 230 includes at least one longitudinal receptacle 234 in an outer surface of the stem rod 230. Each of the longitudinal receptacles 234 is formed to receive and retain one of the sensors 202. The stem rod 230 has a first cross sectional area 236 at a central portion of one of the longitudinal receptacles 234, and a second cross sectional area 238 at a central portion of another one of the longitudinal receptacles 234. As discussed later herein, the cross sectional areas may be the same or different.

In some implementations, a magnet 240 is located in a receptacle 242 formed in each of the proximal surface 212 of the mounting blocks 210. The magnets 240 include a first surface 244 positionable adjacent to the outer surface 203 of the wall 204 of the pipe 201, and a surface 246 positionable adjacent to the mounting blocks 210. In some embodiments, the mount 200 can be mounted to the pipe 201 by the magnets 240. In some embodiments, the mount 200 can be mounted to the pipe 201 by welding, gluing, or otherwise adhering the mounting blocks 210 to the pipe 201.

The mount 200 is assembled in a predetermined strain condition in which the sensor mounting arms 200 are generally parallel to each other and the stem rod 230 is mounted generally perpendicular to a longitudinal axis of each of the sensor mounting arms 220. The pressure of fluid flowing through the pipe 201 exerts pressure on the wall 204, causing variations in the diameter of the outer surface 203. As the diameter changes, the distance between the mounting blocks 210 changes as well. Since the mounting blocks 210 are connected to each other though the sensor mounting arms 220 and across the stem rod 230, as the pipe 201 expands and contracts the stem rod 230 is caused to expand or contract and/or flex. The sensors 202, mounted in the receptacles 234, are caused to expand or contract and/or flex along with the stem rod 230 and provide signals that vary as a function of the flexure and the compressive or tensile stress in the rod.

In some embodiments, the first cross sectional area 236 can have a different cross sectional area than the second cross sectional area 238. In such embodiments, the first cross sectional area 236 will expand or contract or flex at a different rate than the second cross sectional area 238 relative to the expansion and contraction of the pipe 201, and the differing rates of expansion or contraction and flexure can produce differing amounts of stress among the sensors 202. In some implementations, the differing amounts of stress in the sensors can produce a differential signal that can be processed to determine the absolute or changes in fluid pressure within the pipe. In some implementations, the thicknesses of the stem rod 230, the first cross sectional area 236, and the second cross sectional area 238 can be formed to selectively determine the amount compression, tension or flexure that occurs along the stem rod 230, and/or between the sensors 202.

Although a few implementations have been described in detail above, other modifications are possible. For example, logic flows do not require the particular order described, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A method of mounting a strain sensor to a pipe comprising:
   positioning a mechanical clamp circumferentially around an outer surface of a pipe wall, said mechanical clamp having a central longitudinal axis, said mechanical clamp having a plurality of sections including:
      a bottom flexing section having an arcuate portion terminating at a first terminal end in a first bottom flexing section mounting wing and said bottom flexing section terminating at a second end in a second bottom flexing section mounting wing, each of said bottom flexing section mounting wings including an opening there through for receiving a removable connector;
      a first upper flexing section having an arcuate portion terminating at a first terminal end in a first mounting wing and said first upper flexing section terminating at second terminal end in a first pivot pin assembly having a first pivot pin bore parallel to the central longitudinal axis of the clamp, the first mounting wing having an opening there through for receiving a removable connector;
      a second upper flexing section having an arcuate portion terminating at a third terminal end in a second mounting wing and said second upper flexing section terminating at fourth terminal end in a second pivot pin assembly having a second pivot pin bore parallel to the central longitudinal axis of the clamp, the second mounting wing having an opening there through for receiving a removable connector;
      a first sensor mounting arm disposed outwardly on the first upper flexing section, said first sensor mounting arm including at least one first sensor mounting arm receptacle sized to receive and retain a first end of a first strain sensor; and
      a second sensor mounting arm disposed outwardly on the second upper flexing section, said second sensor mounting arm including at least one second sensor mounting arm receptacle sized to receive and retain a second end of the first strain sensor; and
   positioning the first end of the first strain sensor in the first sensor mounting arm receptacle of the first sensor mounting arm and the second end of the first strain sensor in the second sensor mounting arm receptacle of the second sensor mounting arm.

2. The method of claim 1 further comprising:
   inserting one or more individual adjustment rods inwardly in a radial direction toward the longitudinal axis in one or more radial openings in one or more of the bottom flexing section, the first upper flexing, and the second upper flexing section;
   and
   contacting the outer surface of the pipe with a landing pad affixed to an end of each adjustment rod positioned toward the longitudinal axis of the pipe.

3. The mounting system of claim 2, wherein each of the landing pads include a compression pad having at least one layer of vibration and acoustic noise absorbing material affixed to each of the landing pads; and
   the method further includes dampening vibration and acoustic noise from the pipe.

4. The method of claim 1 further comprising:
   positioning the first sensor mounting arm parallel to the second sensor mounting arm when the clamp is in an unstressed condition.

5. The method of claim 1 further comprising:
   positioning a first end of a second strain sensor in a third sensor mounting arm receptacle of the first sensor mounting arm and a second end of the second strain sensor in a fourth sensor mounting arm receptacle of the second sensor mounting arm.

6. The method of claim 1 further including connecting a rigid linking plate to a distal end of the first sensor mounting arm and to a distal end of the second sensor mounting arm.

7. The method of claim 1, wherein a pivot pin configured to engage the first and second pivot pin assemblies includes a compressible coating thereby providing additional flexibility to the mechanical clamp.

* * * * *